Sept. 11, 1934.     L. VITOLO     1,973,587
EYEGLASS STRUCTURE
Filed Jan. 28, 1933
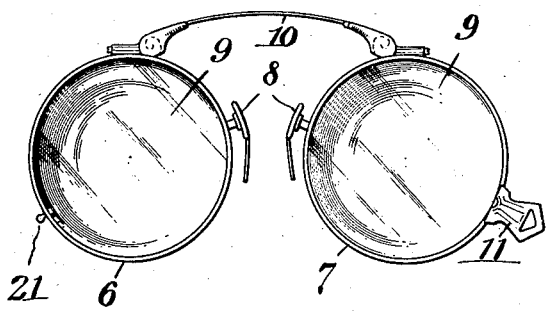
Fig. 1.
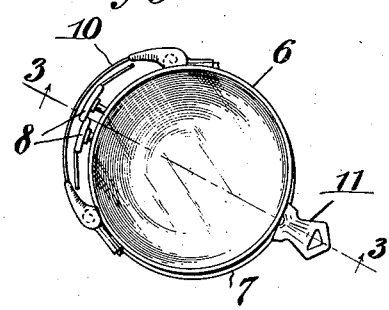
Fig. 2.
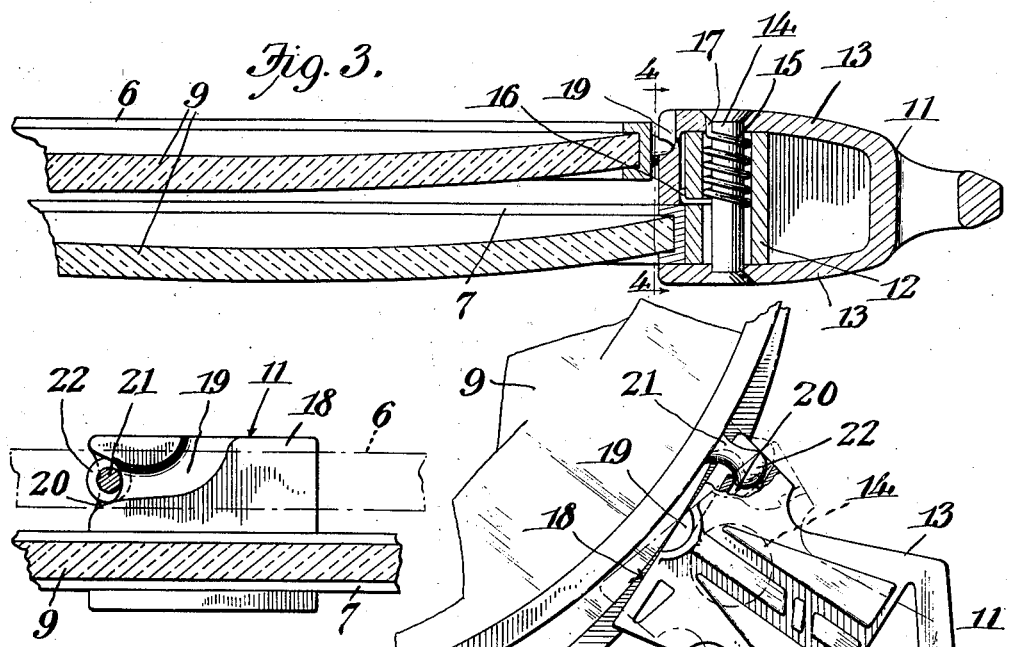
Fig. 3.
Fig. 4.
Fig. 5.
Inventor
Louis Vitolo,
By 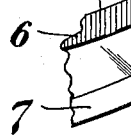
Attorney Patented Sept. 11, 1934

1,973,587

UNITED STATES PATENT OFFICE 1,973,587

EYEGLASS STRUCTURE

Louis Vitolo, Brooklyn, N. Y., assignor to Century Oxford Mfg. Corp., Brooklyn, N. Y., a corporation of New York Application January 28, 1933, Serial No. 654,053

6 Claims. (Cl. 88—44)

This invention relates generally to eyeglass structures, and particularly to oxfords of that character wherein the lens frames are adapted to be nested in parallel relation when collapsed and extended or swung apart under the influence of a spring to assume operative position.

In structures of this type heretofore used, an objection is that in the collapsing and extending operations the lenses rub against one another, resulting in scratching or marring of the lenses. It is a particular object of the present invention to provide collapsible oxfords operating in such manner that the lenses do not come in contact with each other either in the collapsing or extending operations, nor when locked in collapsed position, notwithstanding that the frames are closely nested in spaced parallel relation when in the collapsed position.

A further object of the invention is to provide an eyeglass structure of the character stated having improved holding and releasing means for the free swinging lens frame.

A further object of the invention is to provide means associated with the lens releasing structure whereby the free swinging lens may be enabled to snap away from the holding lens into extended position without the possibility of either the frame or lens coming in contact with the next adjacent frame or lens.

A still further object of the invention is to provide holding means for the collapsed lenses which is of simple and inexpensive construction, which involves the use of but few simple and inexpensive parts, which parts are so constructed and organized as to afford the least possible opportunity for breakage or derangement, which will prove thoroughly practical and efficient in use, and which is easy and simple of operation.

With these objects in view, together with others which will appear as the description proceeds, the invention resides in the novel construction, combination and arrangement of parts, all as will be described more fully hereinafter, illustrated in the drawing, and particularly pointed out in the claims.

In the drawing:—

Fig. 1 is an elevation of a conventional oxford eyeglass structure in extended or operative form and constructed in accordance with the invention.

Fig. 2 is a similar view, showing the frames and the parts in the positions they will assume when in collapsed or folded relation.

Fig. 3 is an enlarged fragmentary sectional view taken substantially upon line 3—3 of Fig. 2.

Fig. 4 is a similar view taken substantially upon line 4—4 of Fig. 3, and

Fig. 5 is a fragmentary elevation of portions of the lens frames and locking mechanism and illustrating particularly the manner in which the locking and releasing actions occur.

Referring now more particularly to the drawing, the oxford structure includes lens frames or rings 6 and 7, having conventional nose grips 8, and each having secured therein the usual lens 9. These frames are secured together by a bridge represented at 10, taking the form, in the present instance, of a spring member to permit of the lens frames being brought into nested parallel relation as shown in Fig. 2. This bridge member, it will be understood, may assume other forms of construction such as will enable the frames to be nested or extended.

The frame 7 is provided preferably at a point substantially diametrically opposite to its nose grip 8 with a handle or lever represented generally at 11. This lever is in the same position and has the appearance of the finger grip now commonly employed in eyeglass structures of this particular type.

In carrying out the invention, the lever or handle 11 is mounted upon or secured to the frame 7 in such manner as to be capable of rocking thereon in the plane of the said frame, and to this end the said frame has secured thereto in any preferred manner a barrel or hollow post 12 having its bore disposed parallel to the axis of the frame and having its upper end disposed well beyond the plane of the frame 7. This hollow post or barrel is embraced by the yoke or arm portions 13 of the handle or lever 11, and a pin 14 extends through the barrel and has its ends rigidly secured to the arm or yoke portions 13 of the lever so as to be substantially an integral part thereof. A coil spring 15 encircles a portion of the pin 14 and has one end 16 permanently secured to the barrel while its opposite end is fixedly secured either to the pin 14 or to the next adjacent arm or yoke portion 13. When the spring is properly tensioned and applied in the manner set forth, it will yieldably maintain the locking lever 11 at the limit of its swinging movement in one direction, while permitting the said lever or handle to be forcibly moved to a reverse position against the tension of the spring.

The inner end of the lever or handle 13 is provided with a face 18 disposed in close proximity to the lens frame 7 and substantially tangential with the inner circumference thereof. This face is provided with a trackway or groove 19 having one end terminating at the outer edge of the face while the other end communicates with a notch or recess 20 near the outer lateral edge of the lever. The trackway or groove 19, therefore, assumes a direction at an angle to the plane of the lens frame 7, leading from the notch to the lateral edge of the lever.

The frame 6 is provided preferably at a point diametrically opposite to its nose grip 8, with a stud, post or prong 21. This prong is adapted to travel in the groove 19 when the oxford is collapsed and to assume interlocking engagement with the notch 20 of the lever 11. The prong may be headed as at 22; the head adapted to engage and lock within the notch 20.

The construction is such that when the lens frame 6 is moved over into nested or aligned position with the frame 7, the headed portion of the prong may engage within the notch 20 of the handle 11. The spring 15 maintains the handle with its notch disposed in locking or prong receiving position. This interlocking engagement is assisted by the spring bridge 10 which is under tension and holds the head engaged within the notch. The resiliency of this spring bridge 10 furthermore, assists in maintaining the handle or lever 10 in locking position due to the fact that the direction of tension of the spring 10 is against the lens frame 7, thus forcing the notched end of the lever in close engagement, with the adjacent portion of its lens frame. When it is desired to release or extend the lens frame 6, it is but necessary to move the handle or lever 11 to its reverse position. This movement causes the lever to rock upon its pivot 14 and withdraw the notch 20 from engagement with the head 22 of the prong, whereupon action of the spring 10 immediately causes the lens frame 6 to snap out into extended position. However, immediately upon withdrawal of the notch 20 from engagement with the head 22, the said head enters the groove or recess 19 in the face 18 of the lever, which groove guides the head in a direction away from the lens frame 7, thus causing the lens frames to separate rapidly and smoothly without the possibility of either the frames or the lenses contacting each other. In this manner danger of scratching the lenses is entirely obviated.

In the present instance the lever or handle is shown as a hollow or yoke member, but it will be understood that this handle may take other forms without departing from the spirit of the invention. Moreover, the arrangement of the barrel and the pivot pin may also be altered for the purposes of expediency, so long as the construction permits of sufficient movement of the handle or lever relative to its supporting lens frame to bring about locking and releasing action.

Having thus described my invention, I claim:—

1. An eyeglass structure comprising a pair of lens frames connected to be assembled or extended in parallel relation, a lever rockably mounted on one of said frames and having a notch therein, said lever having a groove disposed at an angle to the plane of its lens frame and terminating at said notch, and a prong on the other of said frames adapted to slide in said groove to impart lateral motion to the frame and to seat in said notch.

2. An eyeglass structure comprising a pair of lens frames connected to be assembled or extended in parallel relation, a notched lever mounted on one of said frames and rockable in the plane of said frame, said lever having a groove terminating at one end in said notch, a prong on the other frame adapted to travel in said groove and to engage in said notch, said notch adapted to withdraw from and to release said prong to traverse the groove when the lever is rocked in one direction.

3. An eyeglass structure comprising a pair of lens frames connected to be assembled or extended in parallel relation, a lever mounted on one of said frames and rockable in the plane thereof, the face of said lever contiguous to said frame having a notch at one end, said face having a groove extending from said notch to an outer edge of said frame at an angle to the plane of the latter, a prong on the other lens adapted to engage in said notch and to slide in said groove, and said notch releasing said prong to the groove when the lever is moved in one direction.

4. An eyeglass structure comprising a pair of lens frames connected to be assembled or extended in parallel relation, a lever pivoted to one of said frames, a face on said lever disposed in the path of movement of a portion of the other frame, said lever having a notch in said face and a recess leading from one edge of the lever to said notch, a prong on the other frame to ride in said recess and to lock in said notch, said lever adapted to withdraw said notch from said prong when moved in one direction; and a spring normally holding said lever in prong engaging position.

5. An eyeglass structure comprising a pair of lens frames connected to be assembled or extended in parallel relation, a post secured on one of said frames parallel to the axis of said frame, a pin extending through said post, a lever having spaced portions embracing said post and secured to the ends of said pin, a spring in said post encircling said pin, one end of said spring secured to said post and the opposite end secured to said lever, the face of said lever next adjacent to said frame having a groove therein disposed at an angle to the axes of said frame, said face having a notch at one end communicating with said groove, and a prong on the other frame to ride in said groove and lock in said notch.

6. An eyeglass structure comprising a pair of lens frames connected to be nested or extended in parallel relation, resilient means normally constraining the lens frames in or towards extended positions, a lever mounted on one of the frames and having a notch formed therein, said lever being capable of swinging motion to move the notch towards or away from the frame, a spring normally holding the lever in a position in which the notch is disposed adjacent the frame, and a prong on the other lens frame, said prong having an enlarged head which is adapted to engage in said notch and to be held therein by the said resilient means to lock the frames in nested position, said head being moved against the tension of the resilient means when the lever is swung against the tension of its spring to thereby release the head from locking engagement with the notch.

LOUIS VITOLO.